United States Patent Office 3,575,901
Patented Apr. 20, 1971

3,575,901
POLYESTER AND ALKYD RESINS INCLUDING TERTIARY ALKYL MANOAMINE COMPONENT
Henry Ashjian, East Brunswick, N.J., assignor to Mobil Oil Corporation
No Drawing. Filed Apr. 4, 1969, Ser. No. 813,722
Int. Cl. C09d 3/64, 3/66
U.S. Cl. 260—22                                    17 Claims

ABSTRACT OF THE DISCLOSURE

Polyester resins, and especially alkyd resins in mineral spirit solution, are modified for improved compatibility with other resins by condensing into the polyester, including alkyd resins, from 3 to about 30% by weight of alkyl monoamine in which the carbon atom carrying the amine group is a tertiary carbon atom.

---

The present invention relates to resinous polyesters including alkyd resins which possess improved compatibility with other resins and improved solubility in aliphatic hydrocarbon solvent.

The paint and resin industry has been severely handicapped over the years by having resinous polymeric systems that are incompatible with one another. As these resinous polymeric systems have become more and more sophisticated, the lack of inter-compatibility has become a serious problem both in the development and production of resins and paints therefrom, especially where the resinous materials were resinous polyesters such as the conventional alkyd resins. Thus, it has previously been necessary to segregate short oil alkyds from long oil alkyds, saturated (oil-free) alkyds from unsaturated alkyds, copolymer alkyds (styrenated, acrylated, siliconized or urethane) from all other alkyds, etc. To be able to combine one polyester or alkyd with any other alkyd or with epoxy esters, thermoplastic or thermosetting acrylics or vinyl resins, as is possible in accordance with this invention, represents a long sought and valuable achievement.

The incompatibility previously encountered has varied considerably from complete separation of resin components in the liquid coating composition to pigmentation and flow difficulties. In some instances, ageing problems, film non-uniformity or surface irregularity are the main manifestation of the incompatibility. The improvement achieved by the instant invention is marked and can be seen throughout the diversity of compatibility problems previously encountered.

The polyester resins of the present invention are characterized by having condensed therein from 3 to about 30% by weight of alkyl monoamine in which the carbon atom carrying the amine group is a tertiary carbon atom. However, and especially in short oil alkyd resins, the alkyl monoamine is preferably present in an amount of from about 5–15% by weight.

While amines, including monoamines, have been used in polyester resins, primarily to catalyze the esterification reaction, compatibility of the modified polyester with other resins has not been indicated to be of importance and, in the invention, the improved compatibility has been found to require amine proportion and selection along the lines indicated.

While the present invention is broadly applicable to polyester resins which are the reaction products of polycarboxylic acids with polyhydric alcohols, the invention is especially applicable to fatty acid-containing polyester resins which include a proportion of polyhydric alcohol containing at least three hydroxyl groups. Those polyesters normally termed alkyd resins are especially contemplated, particularly those which are normally insoluble in mineral spirits, but which per this invention are modified to be soluble in mineral spirits.

Any tertiary alkyl monoamine may be used in the invention, these being illustrated by t-butyl amine, t-octyl amine, and the higher molecular weight commercial materials such as Primene 81–R, which is principally

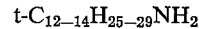

and which has a molecular weight range of from 185 to 213 with the carbon atoms adjacent the single amine group being dimethyl substituted; and Primene JM–T which is principally t-$C_{18-22}H_{37-45}NH_2$ and which has a molecular weight range of from 269 to 325 with the carbon atom attached to the single amine group being dimethyl substituted.

As will be evident from the foregoing, the preferred monoamines which are useful in the invention are tertiary primary amines having the general formula:

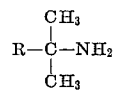

in which the R group is an alkyl group which may contain from 1–30 carbon atoms, preferably from 2–22 carbon atoms. The particularly preferred amines of said formula are those in which R is a $C_{9-11}$ alkyl group.

On the other hand, secondary and tertiary amines are also useful and other functional groups may be present in the molecule as illustrated by t-butylamino ethanol. Tertiary amines such as t-butyl diethanol amine are also useful so that, and from the standpoint of a generic description of preferred materials, these would be embraced by the formula:

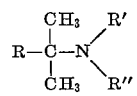

where R is an alkyl group (as indicated hereinbefore) and R' and R" are selected from the group consisting of hydrogen, and alkyl and alkylol groups containing from 1–10 carbon atoms.

Even diverse compounds such as Primid F–12 can be used, this commerical material having the formula:

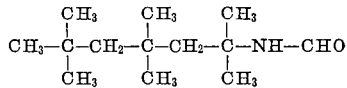

The Primene and Primid compounds noted are commercial materials available from Rohm & Haas Company.

While the present invention is broadly applicable to polyester resins as defined hereinbefore, preference is had for polyesters in which a phthalic acid, and particularly phthalic anhydride, is reacted with other components including a polyhydric alcohol, preferably polyhydric alcohol containing at least three hydroxyl groups such as glycerine, pentaerythritol, trimethylol ethane, trimethylol propane and the like, and either a saturated or unsaturated fatty acid or oil containing the same. The invention is especially applicable to short oil phthalic alkyd systems of improved compatibility and which exhibit improved solubility in aliphatic hydrocarbon solvents. This enables low cost solution coatings to be provided in which the proportion of more noxious solvents such as aromatic hydrocarbons is minimized by the capacity to tolerate the aliphatic hydrocarbon solvents such as mineral spirits or naphtha. On the other hand, the invention includes oil-free polyesters, which will normally include a proportion of diol such as ethylene glycol, neo pentyl glycol and the like. Indeed, the polyhydric alcohol component of the polyesters of the invention may be entirely constituted by diol, or the diol may be used in admixture with polyhydric alcohols containing at least three hydroxy groups.

The preferred dicarboxylic acid is primarily phthalic acid or anhydride, though minor proportions of other dicarboxylic acids such as succinic, azelaic or adipic acids or anhydrides thereof or maleic acid or anhydride may be used in the preferred phthalic-based polyesters. Phthalic anhydride is especially contemplated.

The fatty acids which may be used as such or in a natural or synthetic oil are desirably at least 12 carbon atoms in length but preferably contain from 12–22 carbon atoms and may be saturated, but are preferably unsaturated. The preferred oils are drying oils and the preferred fatty acids are derived therefrom.

Diverse diols, monofunctional acids and alcohols may be present as is conventional. These are illustrated by ethylene glycol, benzoic acid and butyl alcohol.

It is desired to point out that the polyester resins of this invention, including the alkyd resins, may be made from components which include an excess of either hydroxy functionality or carboxy functionality. While the specific resins illustrated in this invention are hydroxyfunctional, carboxy functionality can be employed in excess with equal facility. However, the excess of either functionality with respect to the other is preferably held within the limits of 3–50%. In making the calculations, the amine component utilized by this invention is to be regarded as though it were a monofunctional hydroxide.

In connection with the alkyd resins which are particularly preferred in accordance with the invention, emphasis is placed on short oil alkyds since these are of especial value, being typically formulated to include phthalic anhydride, a polyhydric alcohol containing at least three hydroxyl groups such as glycerine, and triglyceride oil or fatty acids derived therefrom in a proportion of up to 45% by weight. Usually, the oil component is present in an amount of at least 18% by weight. Such alkyd resins are widely used in a variety of applications, such as general metal finishing, coil coatings, packaging, wood finishing, automotive refinishing, automotive primers, and maintenance and marine coatings. However, these resins normally require aromatic hydrocarbon solvents to enable application and they are not adequately soluble in aliphatic hydrocarbon solvents unless modified in accordance with the invention.

The invention is particularly directed to air drying systems in which the short oil alkyd is combined in solution with another thermoplastic resin such as a solution grade vinyl resin, or a solution grade thermoplastic acrylic resin for the purpose of speeding the air drying of the coating to a nontacky surface.

The solution vinyl resins are principally those in which vinyl chloride is present in a proportion of from about 60–90% by weight, with the balance of the copolymer being ethylenically unsaturated material copolymerizable therewith, especially vinyl acetate or vinyl stearate. Small proportions of an ethylenically unsaturated carboxylic acid may desirably be included. Commercial resins such as VMCH, VYHH and VYLF (Union Carbide Corp.) will illustrate the vinyl solution resins which may be used.

Acrylic solution resins which may be utilized are largely constituted by acrylic and methacrylic esters such as methyl methacrylate and ethyl acrylate, but longer chain esters such as 2-ethylhexyl acrylate and butyl methacrylate may be present as well as vinyl aromatic compounds such as styrene or vinyl toluene. Relatively small proportions of unsaturated acids and very small amounts of various adhesion promoting monomers which are known in the art may also be present. Less desirably, reactive monomers which could form the basis for a thermosetting cure may be present, but are preferably absent since these are not utilized in an air drying environment.

The resins which may be used are illustrated by polymethyl methacrylate, an 85/15 weight ratio copolymer of methyl methacrylate and ethyl acrylate, and an 80/18/2 weight ratio copolymer of methyl methacrylate, ethyl acrylate and acrylic acid.

The point to be observed is that the vinyl and acrylic solution resins are generally poorly compatible with short oil alkyds and the invention importantly improves this compatibility which enables air drying systems to be formulated.

The relative proportion of short oil alkyd and solution resin combined therewith can vary widely from a weight ratio of 95/5 to 5/95, prefreably from 75/25 to 25/75.

The polyesters and alkyd resins of the invention can be prepared in various ways as will be evident from the examples which follow.

EXAMPLE 1.—TYPICAL PREPARATION USING FATTY ACID

| Component | Parts by weight | Characteristics | |
|---|---|---|---|
| (1)...... Tall oil fatty acid...... | 1,100 | Viscosity.......... | $Z_2$ |
| (2)...... Glycerine............... | 630 | Acid value........ | 7.0 |
| (3)...... Phthalic anhydride... | 1,155 | Non-volatile...... | 70.0 |
| (4)...... Primene 81R.......... | 315 | Color.............. | 9–10 |
| (5)...... Triphenylphosphite... | 2$\tfrac{9}{10}$ | Percent fatty acid. | 37.0 |
| | | Percent amine..... | 10.5 |
| Water loss................ | 3,202 −217 | | |
| | 2,985 | | |

Procedure of preparation

Charge ingredients 1–5, heat to 450° F. and reflux in xylol under a nitrogen blanket. Hold for an acid value of less than 8.0. Sparge for 15–20 minutes to remove unreacted primary amine and thin to 70% solids in xylol and filter.

EXAMPLE 2.—TYPICAL PREPARATION USING OIL AND ALCOHOLYSIS

| Component | Parts by weight | Characteristics | |
|---|---|---|---|
| (1)...... Safflower oil........... | 1,136 | Viscosity.......... | $Z_1$ |
| (2)...... Glycerine............... | 510 | Acid value........ | 5.6 |
| (3)...... PbO.................... | $\tfrac{7}{10}$ | Non-volatile...... | 70.0 |
| (4)...... Primene 81R.......... | 315 | Color.............. | 9–10 |
| (5)...... Phthalic anhydride... | 1,155 | Percent fatty acid. | 36.7 |
| (6)...... Triphenylphosphite... | 2$\tfrac{9}{10}$ | Percent amine..... | 10.6 |
| Water loss................ | 3,119$\tfrac{9}{10}$ −149$\tfrac{9}{10}$ | | |
| | 2,970 | | |

Procedure of preparation

Charge items 1, 2 and 3 and heat to 450° F. under a nitrogen blanket. Hold for 2:1 (resin solution to methanol) methanol solubility. Cool to less than 400° F. and add items 4, 5 and 6. Increase heat to 450° F. in xylol reflux. Hold for acid value of less than 8.0. Sparge for 20 minutes to remove unreacted amine, thin to 70% solids in xylol and filter.

The alcoholysis preparation procedure is preferred. Further, and in connection with the alcoholysis preparation, it is preferred to insure that the primary amine, on contact with the anhydride, will hydrate to form the salt and, subsequently, form the amide. Thus, the hydration may be conducted separately in xylol using a 2:1 molar ratio of anhydride to amine. Accordingly, as a variation of Example 2, components 4, 5 and 6 are first refluxed in xylol before being added to the alcoholysis product produced by prereaction of the glycerine with the safflower oil.

For alkyd systems wherein a very wide range of compatibility is desired with a variety of systems in all proportions, approximately 10% amine (Primene 81R) is preferably employed in the formulation. Otherwise, modifications as low as about 5% would suffice. Films of the alkyd resin cast on glass 3 mils (wet) and containing 0.5% Co and .5% Pb as catalyst have drying characteristics equal to the unmodified vehicle so long as the proportion of tertiary amine does not exceed about 15%. The air dried films were clear, hard, and tack free.

The surprising compatibility which characterizes the polyesters of the invention is illustrated by the following.

The resins of the foregoing examples were blended with various resins as listed below, using proportions of example resin to blending resin of 75/25 and 50/50. Each of the blends was then modified by the addition thereto of 20% by weight, based on resin solids, of melamine-formaldehyde condensate, and coatings were prepared and baked for 15 minutes at 350° F. to cure the same. In each instance, the solution produced by blending the resins was clear, and no indication of solution incompatibility was noted. The coatings produced were also clear and no evidence of incompatibility could be observed in the baked film. The resins used for blending with the solution products of Examples 1 and 2 are listed below.

(1) Hydroxy-functional thermosetting acrylic containing by weight 35% styrene, 18% methyl methacrylate, 40% 2-ethylhexyl acrylate, 5% hydroxy ethyl methacrylate and 2% acrylic acid.

(2) Carboxyl-functional thermosetting acrylic containing by weight 90% of a 3:1 weight ratio mixture of methyl methacrylate and 2-ethylhexyl acrylate, and 10% of methacrylic acid.

(3) Amide-functional thermosetting acrylic containing by weight 90% of a 3:1 weight ratio mixture of methyl methacrylate and 2-ethylhexyl acrylate, and 10% acrylamide.

(4) Methylol amide thermosetting acrylic (resin 3 reacted with formaldehyde).

(5) Epoxy ester made by esterifying Epon 1004 (a diglycidyl ether of bisphenol A having a molecular weight of about 1850 and an epoxy value per 100 grams of 0.11) with 35% by weight dehydrated castor oil fatty acid.

(6) Epoxy ester made by esterifying Epon 1004 (see above) with 30% by weight of tall oil fatty acid.

Pigmented systems employing safflower oil (Example 2) were ground with titanium dioxide and let down in several alkyd and epoxy systems (the two epoxy esters noted above) and tested for both air dry and baked properties. The alkyd resins tested were typical long, medium and short oil alkyds based on phthalic anhydride and either glycerine or pentaerythritol. The air dried paints exhibited excellent compatibility as evidenced by gloss. The baked systems including 20% melamine-formaldehyde condensate also exhibited good gloss, hardness and flexibility. The baked color, 15 minutes at 350° F., was slightly yellower than a standard alkyd free of amine, however, overbaking 15 minutes more at 350° F. did not cause any more yellowing than initially observed.

EXAMPLE 3.—PRODUCTION OF SHORT OIL ALKYD SOLUTION IN ALIPHATIC HYDROCARBON SOLVENTS

| Component | | Parts by weight | Characteristics | |
|---|---|---|---|---|
| (1) | Safflower oil | 812 | Viscosity | $Z_3$ |
| (2) | Glycerine | 364 | Acid value | 4.7 |
| (3) | PbO | ½ | Non-volatile | 50.0 |
| (4) | Phthalic anhydride | 825 | Color | 9 |
| (5) | Primene 81R | 225 | Weight/gallon | 7.23 |
| (6) | Triphenylphosphite | 2 | Percent fatty acid | 36.8 |
| | | | Percent phthalic anhydride | 39.0 |
| | | 2,228 | | |
| | Water loss | −108 | Percent amine | 10.6 |
| | | 2,120 | | |
| | Aliphatic hydrocarbon solvent (see Note 1). | 2,120 | | |
| | | 4,240 | | |

Procedure of preparation

Charge items 1 and 2 and heat to 400° F., and then add item 3. Raise temperature to 450° F. and hold for 2 hours to permit alcoholysis. Cool to less than 400° F. and add items 4, 5 and 6. Reheat to 450° F. in xylol reflux. Hold for an acid value of less than 7.0. Sparge out xylol and any unreacted amine. Thin to 50% solids in the aliphatic hydrocarbon solvent. Filter to provide a yield of 99%.

The amine-modified alkyd of this example is quite soluble in the aliphatic hydrocarbon solvent and follows a viscosity reduction curve similar to short oil alkyds of the same oil length reduced in xylene. Its air drying properties with .04% Co and .5% Pb are slightly faster than a similar short oil alkyd in xylene and the air dried film is somewhat harder after an overnight dry.

The solution is compatible with other mineral spirit-containing resins such as long and medium oil alkyds.

NOTE 1.—The aliphatic hydrocarbon solvent has the following typical properties:

| | | Distillation | ° F. |
|---|---|---|---|
| API gravity at 60° F | 60.1 | IBP | 247 |
| Specific gravity at 60° F | .7385 | 5% | 251 |
| Pounds per gallon | 6.148 | 10 | 253 |
| Gallons per pound | .1627 | 20 | 255 |
| Color | +30 | 30 | 256 |
| Flash point ° F., Tag CC | 57 | 40 | 258 |
| Doctor test | Sweet | 50 | 260 |
| Corrosion ASTM | Passes | 60 | 262 |
| Corrosion full dist | Passes | 70 | 264 |
| Kauri-butanol No., cc | 33.8 | 80 | 269 |
| Aniline cloud point, ° F | 140 | 90 | 273 |
| | | 95 | 279 |
| | | Dry end point | 287 |
| | | ASTM end point | 290 |

Not only will the short oil alkyd of Example 3 air dry, but it can be cured using 5–50% aminoplast resins. Metal panels coated with the short oil alkyd of Example 3 in admixture with 15% of melamine-formaldehyde condensate and baked for 10 minutes at 350° F., exhibited good gloss and flexibility. Color is substantially the same or very slightly yellower than controls which do not include the amine component. The short oil alkyd of Example 3 is of especial value because of its capacity to air dry when compounded with conventional drying catalysts such as cobalt naphthenate and proportions, e.g., 30% by weight of total resin solids, of vinyl chloride or acrylic solution resins as illustrated hereinbefore can be included in the solution of Example 3 in order to speed the rate of air drying.

EXAMPLE 4

Production of oil-free polyester

| Component: | Parts by weight |
|---|---|
| Para-tertiary butyl benzoic acid | 574 |
| Trimethylol ethane | 600 |
| Primene 81R | 90 |
| Phthalic anhydride | 290 |
| Azelaic acid | 570 |
| | 2124 |

The copolyesterification of the foregoing in Solvesso 150 aromatic hydrocarbon solvent at 55% resin solids yields a polyester resin having an acid value of 5, with the liberation and removal of 202 parts of water. The final product at 55% solids has a Gardner-Holdt viscosity of $Z_2$.

The polyester of Example 4 is curable with melamine-formaldehyde condensate in the same manner as indicated hereinbefore for the product of Example 3.

It should be appreciated that diverse agents may be included in the coating solutions which are formulated in accordance with the invention including flow control agents, catalysts of various type including acidic catalysts, and metal soaps for drying capacity.

The invention is defined in the claims which follow.

I claim:

1. A polyester resin comprising the polyesterification reaction product of components comprising a polycarboxylic acid or anhydride thereof and a polyhydric alcohol, and having condensed therein from 3 to about 30 weight percent of a tertiary-alkyl monoamine having its amino hydrogen atom or atoms unsubstituted except by alkyl or alkylol groups containing from 1 to 10 carbon atoms or a single CHO group.

2. A polyester resin as recited in claim 1 in which said polycarboxylic acid is a dicarboxylic acid and said polyhydric alcohol includes a proportion of polyhydric alcohol containing 3 or more hydroxy groups.

3. A polyester resin comprising the polyesterification reaction product of components comprising dicarboxylic acid or anhydride thereof, a fatty acid or triglyceride oil containing the same, a polyhydric alcohol containing 3 or more hydroxy groups, and having condensed therein from 3 to about 30 weight percent of a tertiary-alkyl monoamine having its amino hydrogen atom or atoms unsubstituted except by alkyl or alkylol groups containing from 1 to 10 carbon atoms or a single CHO group.

4. A polyester resin as recited in claim 3 in which said dicarboxylic acid is phthalic acid or anhydride.

5. A polyester resin as recited in claim 3 in which said polyhydric alcohol is glycerine.

6. A polyester resin as recited in claim 3 in which said monoamine is a primary monoamine present in an amount of from about 5–15% by weight.

7. A polyester resin as recited in claim 3 in which phthalic anhydride is reacted with the alcoholysis reaction product of glycerine and a fatty acid triglyceride.

8. A polyester resin as recited in claim 3 in which said monoamine has the formula:

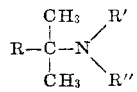

where R is an alkyl group containing from 1–30 carbon atoms, and R' and R'' are selected from the group of hydrogen, and alkyl and alkylol groups containing up to 10 carbon atoms.

9. A polyester resin as recited in claim 3 in which said monoamine is a primary amine having the formula:

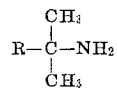

where R is an alkyl group containing from 2–22 carbon atoms.

10. A polyester resin as recited in claim 9 where R is an alkyl group containing from 9–11 carbon atoms.

11. A polyester resin as recited in claim 3 in which said polyester contains hydroxy and carboxy functionality with a 3–50% excess of one over the other, said monoamine entering the calculation as though it were monofunctional hydroxy compound.

12. A short oil alkyd comprising the polyesterification reaction product of components comprising a phthalic acid or anhydride, from 18 to 45% by weight of a fatty acid or triglyceride oil containing the same, a polyhydric alcohol containing at least 3 hydroxyl groups, and from about 5–15% by weight of a tertiary-alkyl monoamine having its amino hydrogen atom or atoms unsubstituted except by alkyl or alkylol groups containing from 1 to 10 carbon atoms or a single CHO group.

13. A short oil alkyd as recited in claim 12 in which phthalic anhydride is reacted with the alcoholysis reaction product of glycerine and a fatty acid triglyceride and said monoamine has the formula:

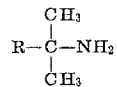

where R is an alkyl group containing from 1–30 carbon atoms.

14. A short oil alkyd as recited in claim 12 in which said alkyd is in solution in a solvent medium consisting essentially of aliphatic hydrocarbon solvent.

15. An air drying solution coating comprising the short oil alkyd of claim 12 in which said fatty acid or trigylceride oil containing the same is unsaturated, said alkyd being in solution in an organic solvent in admixture with a solution vinyl copolymer or a solution acrylic polymer.

16. An air drying solution coating as recited in claim 15 in which said solution vinyl copolymer is a copolymer containing from about 60–90% by weight of vinyl chloride.

17. An air drying solution coating as recited in claim 15 in which said solution acrylic polymer is primarily constituted by alcohol esters of acrylic or methacrylic acids.

References Cited

UNITED STATES PATENTS

| | | | |
|---|---|---|---|
| 2,852,491 | 9/1958 | Caldwell | 260—75 |
| 3,196,118 | 7/1965 | Peters | 260—22 |
| 3,380,961 | 4/1968 | Dressler et al. | 260—45.9 |
| 3,391,110 | 7/1968 | Coleman | 260—47 |
| 3,408,422 | 10/1968 | May | 260—837 |
| 3,406,223 | 10/1968 | Gibbs | 260—857 |
| 3,436,367 | 4/1969 | McInerney | 260—40 |

DONALD E. CZAJA, Primary Examiner

R. W. GRIFFIN, Assistant Examiner

U.S. Cl. X.R.

117—124, 132, 161; 260—21, 23, 33.6, 40, 41, 75